June 17, 1924.
A. L. YOUNG
CHAIN CONNECTER
Filed April 5, 1923
1,497,707
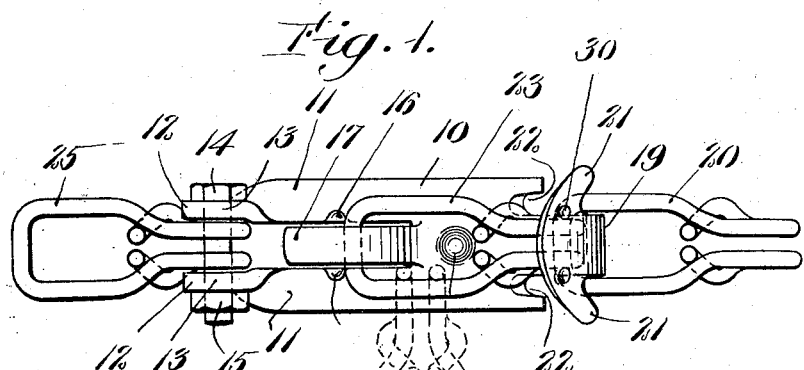
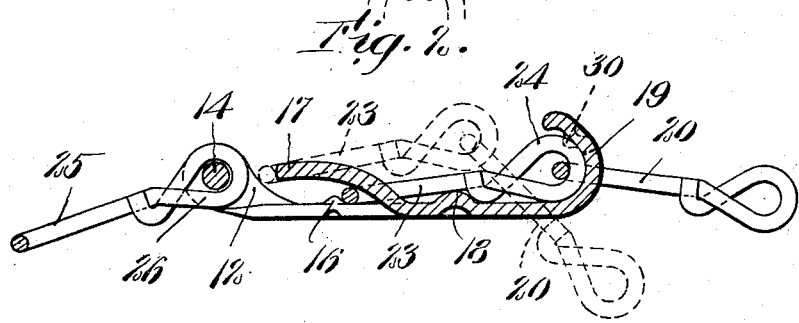
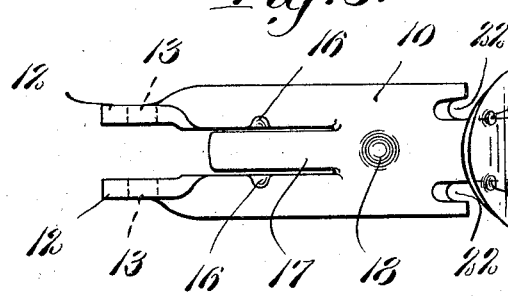
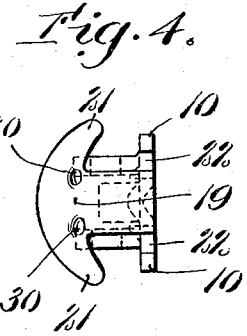
Inventor.
Albert L. Young
by James R. Hodder
atty.

Patented June 17, 1924.

1,497,707

UNITED STATES PATENT OFFICE.

ALBERT L. YOUNG, OF HAVERHILL, MASSACHUSETTS.

CHAIN CONNECTER.

Application filed April 5, 1923. Serial No. 630,125.

*To all whom it may concern:*

Be it known that I, ALBERT L. YOUNG, a citizen of the United States, and a resident of Haverhill, in the county of Essex and State of Massachusetts, have invented an Improvement in Chain Connecters, of which the following description, in connection with the accompanying drawings, is a specification, like letters on the drawings representing like parts.

My present invention relates to connecters, and more particularly to an improved connecter for use in connecting together the ends of non-skid automobile chains.

As is well known, non-skid chains, preferably loosely mounted on driving wheels of a motor driven vehicle, are used in wet or winter weather as an aid in obtaining traction and as a preventative to skidding. Such non-skid chains comprise essentially two lengths of chain connected together along their length by cross links, the cross links, when the non-skid chain is in position on the tire, extending transversely across the tread of the tire, while the lengths of chains are positioned in a circle, one on each side of the tire, the ends of each of the chains being connected together to form in this manner practically two circular chains of less diameter than the outer diameter of the wheel to which the chains are attached. As these chains are subjected to considerable strain, and as, when the vehicle to which they are attached, is moving at speed, it is necessary that the ends of the chains be securely fastened together. Failure to do so results in the non-skid chain, as a whole, being forced out of position and numerous cases of accidents have occurred where the chains have slipped off and have been wound up on the brakeband of the driving axle of the vehicle. Further, a great many chains have been lost and their loss not noticed until the operator of the vehicle has brought the same into a position where such chains are absolutely necessary.

When non-skid chains were first put in use, a simple snap connecter was utilized to connect the ends of the chains and, though the desirability of a connecter for such chains has been apparent ever since non-skid chains have been used and although a great amount of effort and time has been expended, no device of which I am aware has been devised that would fulfill the necessary requirements of such connecter; that is, it must be cheap to manufacture, simple in construction and easy to manipulate, and it must hold the ends of the chain together under all conditions of service without failure.

In my present invention I have devised a structure that fulfills all the above requirements and such construction will connect the ends of a chain together and keep them in such connected position until the connecter is operated in a manner to disconnect the ends of the chain.

The object of my invention, therefore, is an improved connecter for connecting together the ends of side members of non-skid chains.

In the accompanying drawing illustrating the preferred embodiment of my invention.

Fig. 1 is a plan view showing the device attached to, and connecting together, the ends of the side members of a non-skid chain;

Fig. 2 is a vertical longitudinal elevation of Fig. 1;

Fig. 3 is a plan view similar to Fig. 1, but with the side members of the non-skid chains removed, and Fig. 4 is an end view, from the left, of Fig. 3.

Referring to the drawings 10 designates a body member having formed integral therewith and extending from one end thereof spaced legs 11, the ends of these legs being turned at a right angle to form parallelly arranged ears 12, each of the ears being provided with holes 13 through which passes the body portion of a threaded bolt 14, this bolt 14 being provided with a nut 15. The spaced legs 11 on the opposed edges thereof and intermediate the ends have formed upwardly extending projections 16 for a purpose to be hereinafter described. Formed integral with the body portion 10 and extending to the left, as viewed in Figs. 1, 2, and 3, and above and in alinement with the space defined by the legs 11 is a curved hook member 17. Struck up from the upper face of the body member 10 and centrally located with respect thereto is a projection 18. The body member 10, at the end remote from the legs 11, has formed integral therewith a curved plate 19 of a width slightly less than the space defined by the parallelly arranged portions of a chain link 20, this curved plate 19 being curved upwardly and then rearwardly, or to the left, as shown in the drawings, and the upper end thereof is enlarged to provide hook-like projections 21. At the junction of the plate 19 with the body portion 10 and in the body portion 10 are provided recesses 22.

The side members of a non-skid chain of which the link 23 comprises one end, such link 23 being attached by the eye 24 to the link 20, while the link 25 constitutes the other end of such side member, and this link 25 is attached to the legs 11 by the bolt 14 passing through the eye 26 thereof.

Assuming that the device is constructed as above described and with the link 25 attached to the legs 11 by means of the bolt 14 and that it is desired to connect the other end of the side members, this other end being represented by the links 20 and 23, the link 20 is slipped over the projections 21 and is moved into the position shown in dotted lines in Fig. 2 which will bring the end of the link 23 into such a position that the end bar of such link will slip over the end of the curved hook member 17, after which the links 20 and 23 may be drawn into the position shown in full lines in Fig. 2 with the end member of the link 23 between the projections 16 and the curved member 17 and with the eye 24 of such member resting in the pocket formed by the curved plate 19, and with the ends of the wire forming the link 23 slightly behind the upwardly extending projection 18. As thus assembled, the non-skid chain may be subjected to any strain without danger of the links 20 and 23 becoming detached from the device as, in order to detach the links 20 and 23 from the device, it is necessary to first swing the eye portion of the link 20 downward into the position shown in Fig. 2, which operation carries the eye 24 of the link 23 out of the pocket formed by the curved plate 19 and this action will force the end portion of the link 23 forward into the position to be disengaged by the curved hook member 17.

It may be desirable, in connection with the upper or outer end of the curved member 19, to utilize one or more projections so arranged with respect to the portion 19 as to extend downwardly to engage the metal forming the eye 24 of the link 23. My invention is complete, however, without the addition of such projections and I do not, therefore, wish to be limited to the structure in which such projections must necessarily appear.

Having thus described my invention, what I claim as new is:

1. An improved connecter for connecting together the ends of non-skid chains, comprising a body portion, parallelly arranged spaced legs formed at one end thereof, means on said legs for connecting the device to one end of a chain, upwardly extending projections formed on the opposed edges of the legs, a curved hook member formed integral with the body portion and extending above and in alinement with the legs, a curved plate formed on the body portion at the end remote from the hook member, and laterally extending projections on the upper end of said curved member.

2. An improved connecter for connecting the ends of non-skid chains and the like, comprising a body portion, parallelly arranged legs spaced apart from each other and extending from one end of the body member, means on said legs for connecting the device to one end of a non-skid chain, a curved hook member formed integral with the body portion and extending parallel to, and above, the legs and forming means for engagement with the extreme link on the other end of the chain, and an upwardly curved plate formed integral with the body portion on the end remote from the hook member for engaging the next to the end link on said chain.

3. An improved connecter for non-skid chains and the like, comprising a body portion, an upwardly extending curved plate formed at one end thereof and provided on its upper end with laterally extending projections, this upwardly curved plate forming a pocket to seat the eye of a link on one end of a chain, an upwardly extending projection formed in the plate for engaging with the said link, a curved hook member formed on the other end of said body portion and engaging with the cross bar of said link, parallelly arranged legs formed on such side member and lying beneath and parallel to a curved hook member, and means on said legs for engaging with the cross member of said link for preventing movement of said link longitudinally of the hook member.

In testimony whereof, I have signed my name to this specification.

ALBERT L. YOUNG.